(12) United States Patent
Teissier

(10) Patent No.: US 12,264,724 B2
(45) Date of Patent: Apr. 1, 2025

(54) METHOD OF FORMING A RIGID ROD ON AN END OF A TENSION MEMBER

(71) Applicant: Millfield Terminations Limited, Newcastle upon Tyne (GB)

(72) Inventor: Jean Marc Teissier, Meylan (FR)

(73) Assignee: Millfield Terminations Limited, Newcastle upon Tyne (GB)

( * ) Notice: Subject to any disclaimer, the term of this patent is extended or adjusted under 35 U.S.C. 154(b) by 600 days.

(21) Appl. No.: 17/416,356

(22) PCT Filed: Nov. 28, 2019

(86) PCT No.: PCT/GB2019/053359
§ 371 (c)(1),
(2) Date: Jun. 18, 2021

(87) PCT Pub. No.: WO2020/128422
PCT Pub. Date: Jun. 25, 2020

(65) Prior Publication Data
US 2021/0381162 A1 Dec. 9, 2021

(30) Foreign Application Priority Data

Dec. 21, 2018 (GB) ..................................... 1821015

(51) Int. Cl.
*F16G 11/04* (2006.01)
*D07B 9/00* (2006.01)
(Continued)

(52) U.S. Cl.
CPC ............ *F16G 11/042* (2013.01); *F16G 11/04* (2013.01); *D07B 9/00* (2013.01); *E01D 19/16* (2013.01); *E04H 12/20* (2013.01)

(58) Field of Classification Search
CPC ................................ D07B 9/00; F16G 11/042
See application file for complete search history.

(56) References Cited

U.S. PATENT DOCUMENTS

| | | | | |
|---|---|---|---|---|
| 1,680,347 A | * | 8/1928 | Sunderland | ............. F16G 11/05 403/275 |
| 3,264,017 A | * | 8/1966 | Howe | ................... F16G 11/042 24/265 EE |

(Continued)

FOREIGN PATENT DOCUMENTS

| | | |
|---|---|---|
| DE | 861347 | 12/1952 |
| DE | 6601081 | 4/1969 |

(Continued)

OTHER PUBLICATIONS

International Search Report and Written Opinion issued in International Application No. PCT/GB2019/053359 , mailed on Feb. 26, 2020, 13 pages.

(Continued)

*Primary Examiner* — Kyle A Cook
(74) *Attorney, Agent, or Firm* — Messner Reeves LLP

(57) ABSTRACT

A tension member has fibres straightened such that they are substantially parallel. The fibres are then held in the base of mould. A curable resin such as castable synthetic polymer resin, is applied around the fibres.
The side of mould is then placed on base trapping compression tool as part of the mould. The cylindrical cavity defined by the mould is filled with curable resin, The curable resin is then allowed to set, and the mould removed to form a rigid rod on the end of the tension member.

7 Claims, 5 Drawing Sheets

(51) Int. Cl.
    *E01D 19/16*           (2006.01)
    *E04H 12/20*           (2006.01)

(56)               References Cited

U.S. PATENT DOCUMENTS

| | | |
|---|---|---|
| 3,464,093 A | 9/1969 | Laharty |
| 4,673,309 A * | 6/1987 | Schlaich ................ F16G 11/05 403/275 |
| 5,027,497 A | 7/1991 | Takaki et al. |
| 2005/0082716 A1 | 4/2005 | Barefield |
| 2005/0204555 A1 * | 9/2005 | Campbell ............. F16G 11/042 29/874 |
| 2018/0051522 A1 * | 2/2018 | Sjostedt ................ E21B 17/042 |

FOREIGN PATENT DOCUMENTS

| | | | |
|---|---|---|---|
| EP | 0974708 | 1/2000 | |
| EP | 1331321 | 7/2003 | |
| GB | 1909/23354 | 4/1910 | |
| GB | 1085558 A * | 10/1967 | ............ B29B 15/08 |
| JP | H07 42310 | 2/1995 | |
| JP | H0882347 | 3/1996 | |
| NL | 6513132 | 8/1966 | |
| NL | 7212077 | 3/1974 | |
| WO | 2016145289 | 9/2016 | |

OTHER PUBLICATIONS

Combined Search and Examination Report under Sections 17 and 18(3) for Application No. GB1821015.3, mail date Jun. 14, 2019, 5 pages.

\* cited by examiner

METHOD OF FORMING A RIGID ROD ON AN END OF A TENSION MEMBER

CROSS-REFERENCE TO RELATED APPLICATIONS

This application is the U.S. National Stage of International Application No. PCT/GB2019/053359 filed on Nov. 28, 2019, which claims the benefit of United Kingdom Patent Application No. 1821015.3, filed on Dec. 21, 2018, the contents of which are incorporated herein by reference in their entireties.

FIELD OF THE INVENTION

The present invention relates to a method of forming a rigid rod on an end of a tension member formed from natural or synthetic fibres or wire, and relates particularly, but not exclusively to a method of forming a rigid rod on an end of a tension member formed from natural or synthetic fibres or wire for the purpose of enabling such a tension member to be terminated in a wedged socket.

BACKGROUND OF THE INVENTION

Tension members such as ropes formed from natural or synthetic fibres or wire can be terminated in several ways. For example, the end of the rope can be tied to an anchor point. However, when such an anchor is required to be a permanent fixture such as wire ropes used in bridge construction, or guy lines for anchoring tower structures, a temporary fixture is insufficient.

DETAILED DESCRIPTION

Figure 4:
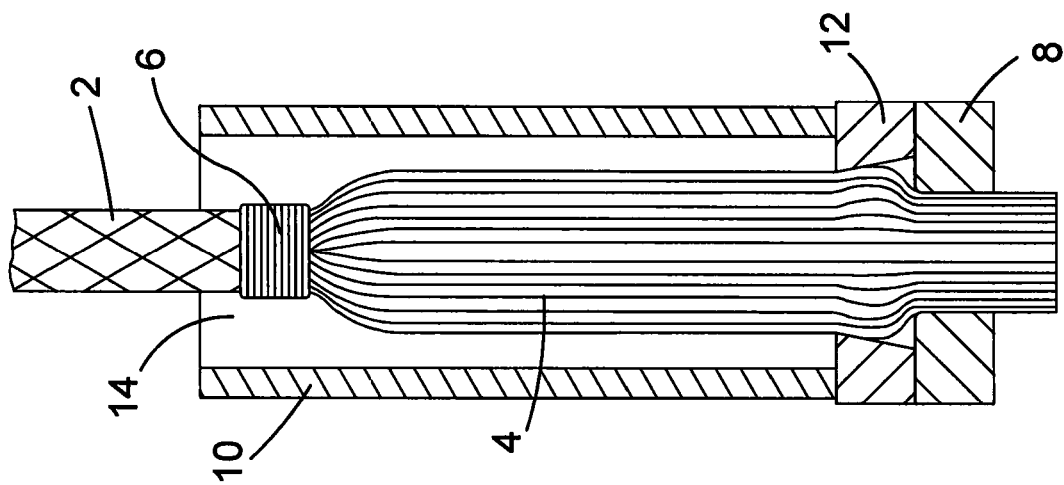
FIG. 4 is a cross-sectional view of a mould in which the tension member of FIG. 1 is held in order to be filled with curable resin to set to form a rod with a sleeve.

The present invention relates to a method of forming a rigid rod on an end of a tension member formed from natural or synthetic fibres or wire, and relates particularly, but not exclusively to a method of forming a rigid rod on an end of a tension member formed from natural or synthetic fibres or wire for the purpose of enabling such a tension member to be terminated in a wedged socket. The present invention also relates to a tension member in which the fibres or wires forming the tension member are arranged in a substantially straight configuration and are embedded in resin.

Tension members such as ropes formed from natural or synthetic fibres or wire can be terminated in several ways. For example, the end of the rope can be tied to an anchor point. However, when such an anchor is required to be a permanent fixture such as wire ropes used in bridge construction, or guy lines for anchoring tower structures, a temporary fixture is insufficient.

For more permanent fixtures, ropes are commonly terminated in potted sockets. At the end of the rope to be terminated, the strands and yarns or wires are broomed out and placed in the socket. The socket is then filled with a resin such as a castable synthetic polymer resin which hardens in the socket and sets the end of the rope in the socket. An eye on the socket can then be anchored permanently and the rope tensioned. However, such potted sockets whilst being ideal for small ropes, tend to become more prone to failure as the rope size increases. Furthermore, once the rope is terminated in such a socket, there is no way to demount the termination for inspection and repair.

A solution to some of these problems is proposed in U.S. Pat. No. 5,415,490. This document discloses an insert to be placed in the tapered cavity of the socket. The insert comprises a body tapered in the same direction as the cavity in the socket. Six radial plates extend from the tapered body. The strands and yarns of the rope are then separated by the radial plates into six segments and resin is then poured into each segment. This has the effect of cutting a larger rope into six smaller segments. In other words, to solve the problem of a potted socket being unable to terminate a larger rope, the end of the larger rope is cut into six smaller segments and sealed with resin in six potted sockets.

A similar solution is proposed in U.S. Pat. No. 5,735,628. This document discloses a termination device comprising a plurality of frusto-conical hollow tubes into which separated ends of a rope are terminated. Conically shaped wedge members are inserted into the yarns of the rope in each frusto-conical tube. This document therefore also proposes separating the end of a rope to be terminated into several smaller terminations. This document therefore also proposes separating the end of the rope to be terminated into several smaller rope terminations.

Alternative solutions to some of the problems set out above are disclosed in DE6601081U, EP1331321, U.S. Pat. No. 6,322,281, GB23354, JPH0882347 and U.S. Pat. No. 5,027,497. All of these documents disclose either pressing on or moulding a sleeve around the end of a tension member to be terminated. The end of the tension member around which the sleeve is formed can then be wedged into a socket termination. This enables the socket to be dismounted to release the sleeve for inspection and repair. However, it has been found that such methods result in uneven stresses being placed on the end of the tension member around which the sleeve is formed. This can cause degradation, wear and even failure.

Preferred embodiments of the present invention seek to overcome the above disadvantages of the prior art.

According to an aspect of the present invention, there is provided a method of forming a rigid rod on an end of a tension member formed from natural or synthetic fibres, the method comprising:

separating the fibres forming an end of a tension member and arranging said fibres such that they are substantially straight and parallel to one another;
applying a curable resin to said fibres;
compressing said fibres to which said curable resin has been applied;
arranging said fibres in a mould and allowing said resin to set to form a rod containing said fibres; and
removing the mould once said curable resin has set.

This provides the advantage of a means for enabling a rope formed from synthetic or natural fibres to be reliably terminated in a wedged socket. By arranging the fibres of the rope in a substantially parallel configuration and embedding the fibres in a rod of curable resin, it has been found that this distributes the load placed on the rope in the socket much more evenly than for example when a sleeve is simply formed or pressed around the outside of a rope. This has been found to significantly reduce rope degradation and the risk of termination failure.

The formation of the rod therefore provides a rigid element which can be used in a wedged socket. This enables separation of the functions which enable a termination to work effectively, for example creation of a bearing pressure onto the tension member and the management of this pressure in order not to over-stress the tension member. It has advantageously been found that this enables larger fibre ropes to be terminated in a wedged socket. This is potentially important as it is preferable to use fibre ropes which weigh less than wire ropes for very long rope lengths (where wire ropes are prone to break under their own weight). For example, long ropes are required in the mooring of offshore installations in deep water. However, the traditional problem has been how to terminate such long fibre ropes. The method disclosed herein solves this problem.

This also provides the advantage of a termination for a tension member such as a rope that can hold the end of a larger rope in a single socket without the end of the rope having to be split and without additional components being required to be inserted into the yarns and strands of the rope. This reduces the cost and complexity of termination of larger ropes.

This also provides the advantage that the rope can be released and re-mounted in some forms of wedge termination if required due to the mechanical nature of the retention of the end of the rope. This enable inspection and repair of such wedge terminations which is not possible with known potted socket type terminations.

Furthermore, the formation of a rod on the end of a rope to be retained provides the advantage of increasing the contact area between the wedges in the socket and the rope because the natural undulations on the surface of the rope are covered by the rod, forming a flat surface for the wedges to contact.

Moreover, this enables rod diameter to be chosen to enable management of pressure onto the elements of the tension member.

In a preferred embodiment, the method further comprises the step of filling a cylindrical cavity defined by the mould with curable resin to form a first sleeve around the end of said fibres.

This provides the advantage of ensuring that rope fibres close to the surface of the rod are encased in a protective layer that stops the potential nipping of any individual fibres by any of the moveable parts of the wedge or socket body in a termination which could weaken the termination.

In a preferred embodiment, the method further comprises the step of placing said rod and sleeve in a larger mould and filling said larger mould with curable resin to form a second sleeve around the end of said rod.

For larger ropes, a large amount of heat is produced during the curing of resin. It has therefore been found that it is advantageous to form multiple sleeves around the end of a rod of a larger rope to prevent overheating.

In a preferred embodiment, the method further comprises gripping the ends of said fibres with a base of said mould after the fibres have been straightened.

In a preferred embodiment, the step of compressing said fibres to which said curable resin has been applied comprises passing said fibres through an aperture of a compression member.

This provides the advantage of ensuring that all of the fibres are coated with resin to reduce the likelihood of defects within the rod.

In a preferred embodiment, the step of separating the fibres forming an end of a tension member and arranging said fibres such that they are substantially straight includes brooming out and/or brushing said fibres.

In a preferred embodiment, the step of arranging said fibres in a mould and allowing said resin to set to form a rod includes arranging said fibres in a mould having a substantially cylindrical cavity.

According to another aspect of the present invention, there is provided a natural or synthetic fibre rope comprising an end in which the fibres of the rope are arranged to be substantially straight and parallel, wherein said fibres are encased in substantially cylindrical rod of curable resin.

This provides the advantage of a means for enabling a rope formed from synthetic or natural fibres to be reliably terminated in a wedged socket. By arranging the fibres of the rope in a substantially parallel configuration and embedding the fibres in a rod of curable resin, it has been found that this distributes the load placed on the rope in the socket much more evenly than for example when a sleeve is simply formed or pressed around the outside of a rope. This has been found to significantly reduce rope degradation and the risk of termination failure.

The formation of the rod therefore provides a rigid element which can be used in many forms of a wedged socket. This enables separation of the functions which enable a termination to work effectively, for example creation of a bearing pressure onto the tension member and the management of this pressure in order not to over-stress the tension member. It has advantageously been found that this enables larger fibre ropes to be terminated in a wedged socket. This is potentially important as it is preferable to use fibre ropes which weigh less than wire ropes for very long rope lengths (where wire ropes are prone to break under their own weight). For example, long ropes are required in the mooring of offshore installations in deep water. However, the traditional problem has been how to terminate such long fibre ropes. The method disclosed herein solves this problem.

This also provides the advantage of a termination for a tension member such as a rope that can hold the end of a larger rope in a single socket without the end of the rope having to be split and without additional components being required to be inserted into the yarns and strands of the rope. This reduces the cost and complexity of termination of larger ropes.

This also provides the advantage that the rope can be released and re-mounted in some forms of wedge termination if required due to the mechanical nature of the retention of the end of the rope. This enable inspection and repair of such wedge terminations which is not possible with known potted socket type terminations.

Furthermore, the formation of a rod on the end of a rope to be retained provides the advantage of increasing the contact area between the wedges in the socket and the rope because the natural undulations on the surface of the rope are covered by the rod, forming a flat surface for the wedges to contact.

Moreover, this enables rod diameter to be chosen to enable management of pressure onto the elements of the tension member.

In a preferred embodiment the natural or synthetic fibre rope further comprises a substantially cylindrical sleeve of curable resin formed around said end of said substantially cylindrical rod.

This provides the advantage of ensuring that rope fibres are not located close to the outer surface of the rod or sleeve which can weaken the rod.

According to a further aspect of the present invention, there is provided a termination assembly for retaining a natural or synthetic fibre rope as defined above, the assembly comprising:
a socket defining a tapered cavity for receiving an end of a natural or synthetic fibre rope to be retained in the assembly, wherein the cross-sectional area of said tapered cavity decreases towards an open end through which said natural or synthetic fibre rope is received;
a natural or synthetic fibre rope produced in accordance with this disclosure, wherein the end of said natural or synthetic fibre rope in which the fibres of the rope are arranged to be substantially straight and parallel, wherein said fibres are encased in substantially cylindrical rod of curable resin is disposed in said socket; and
at least one wedge member insertable in said tapered cavity between said end of said natural or synthetic fibre rope and a side of said tapered cavity to retain said natural or synthetic fibre rope in said tapered cavity by friction.

This provides the advantage of a termination for a fibre tension member such as a rope which has been found to enable termination of larger ropes than can be terminated in known potted sockets. The formation of a rod integrally on the end of a fibre rope enables the rod to be wedged in a wedge-type termination. The rod distributes a load evenly throughout the fibres of the rope which reduces the likelihood of rope failure and breakage enabling larger ropes to be terminated.

This also provides the advantage that the termination can be released to enable inspection and repair.

According to a further aspect of the present invention, there is provided a method of forming a rigid rod on an end of a tension member formed from wire, the method comprising:
separating the wires forming an end of a tension member and arranging said wires such that they are substantially straight;
arranging said wires in a mould and filling the mould with a curable resin or molten metal;
allowing said curable resin or molten metal to set to form a rod containing said wires; and
removing the mould once the curable resin or molten metal has set.

This provides the advantage of a means for enabling a rope formed wire to be reliably terminated in a wedged socket. By arranging the wires of the rope in a substantially parallel configuration and embedding the wires in a rod of curable resin or molten metal, it has been found that this distributes the load placed on the rope in the socket much more evenly than for example when a sleeve is simply formed or pressed around the outside of a rope. This has been found to significantly reduce rope degradation and the risk of termination failure.

The formation of the rod therefore provides a rigid element which can be used in a wedged socket. This enables separation of the functions which enable a termination to work effectively, for example creation of a bearing pressure onto the tension member and the management of this pressure in order not to over-stress the tension member.

This also provides the advantage of a termination for a tension member such as a rope that can hold the end of a larger rope in a single socket without the end of the rope having to be split and without additional components being required to be inserted into the wires of the rope. This reduces the cost and complexity of termination of larger wire ropes.

This also provides the advantage that the rope can be released and re-mounted in some forms of wedge termination if required due to the mechanical nature of the retention of the end of the rope. This enables inspection and repair of such wedge terminations which is not possible with known potted socket type terminations.

Furthermore, the formation of a rod on the end of a rope to be retained provides the advantage of increasing the contact area between the wedges in the socket and the rope because the natural undulations on the surface of the rope are covered by the rod, forming a flat surface for the wedges to contact.

Moreover, this enables rod diameter to be chosen to enable management of pressure onto the elements of the tension member.

In a preferred embodiment, the method further comprises the step of placing said rod in a larger mould and filling said larger mould with curable resin or molten metal to form a sleeve around the end of said rod.

This provides the advantage of ensuring that individual wires forming the rope are not located close to the outer surface of the rod or sleeve which can weaken the rod.

In a preferred embodiment, the method further comprises gripping the ends of said wires with a base of said mould after the wires have been straightened.

In a preferred embodiment, the step of arranging said wires in a mould and allowing said curable resin or molten metal to set to form a rod includes arranging said wires in a mould having a substantially cylindrical cavity.

According to another aspect of the present invention, there is provided a wire rope comprising an end in which the wires of the rope are arranged to be substantially straight, wherein said wires are encased in substantially cylindrical rod of curable resin or metal.

This provides the advantage of a means for enabling a rope formed wire to be reliably terminated in a wedged socket. By arranging the fibres of the rope in a substantially parallel configuration and embedding the fibres in a rod of curable resin or molten metal, it has been found that this distributes the load placed on the rope in the socket much more evenly than for example when a sleeve is simply formed or pressed around the outside of a rope. This has been found to significantly reduce rope degradation and the risk of termination failure.

The formation of the rod therefore provides a rigid element which can be used in a wedged socket. This enables separation of the functions which enable a termination to work effectively, for example creation of a bearing pressure onto the tension member and the management of this pressure in order not to over-stress the tension member.

This also provides the advantage of a termination for a tension member such as a rope that can hold the end of a larger rope in a single socket without the end of the rope having to be split and without additional components being required to be inserted into the wires of the rope. This reduces the cost and complexity of termination of larger wire ropes.

This also provides the advantage that the rope can be released and re-mounted in some forms of wedge termination if required due to the mechanical nature of the retention of the end of the rope. This enable inspection and repair of such terminations which is not possible with known potted socket type terminations.

Furthermore, the formation of a rod on the end of a rope to be retained provides the advantage of increasing the contact area between the wedges in the socket and the rope because the natural undulations on the surface of the rope are covered by the rod, forming a flat surface for the wedges to contact.

Moreover, this enables rod diameter to be chosen to enable management of pressure onto the elements of the tension member.

In a preferred embodiment, the wire rope further comprises a substantially cylindrical sleeve of curable resin or metal formed around said end of said substantially cylindrical rod.

This provides the advantage of ensuring that individual wires forming the rope are not located close to the outer surface of the rod or sleeve which can weaken the rod.

According to another aspect of the present invention, there is provided a termination assembly for retaining a wire rope as defined above, the assembly comprising:
a socket defining a tapered cavity for receiving an end of a wire rope to be retained in the assembly, wherein the cross-sectional area of said tapered cavity decreases towards an open end through which said wire rope is received;
a wire rope as defined above, wherein the end of said wire rope in which the wires of the rope are arranged to be substantially straight, wherein said wires are encased in substantially cylindrical rod of curable resin or metal is disposed in said socket; and
at least one wedge member insertable in said tapered cavity between said end of said wire rope and a side of said tapered cavity to retain said wire rope in said tapered cavity by friction.

This provides the advantage of a termination for a wire rope which has been found to enable termination of larger ropes than can be terminated in known spelter sockets. The formation of a rod integrally on the end of a wire rope enables the rod to be wedged in a wedge-type termination. The rod distributes a load evenly throughout the wires of the rope which reduces the likelihood of rope failure and breakage enabling larger ropes to be terminated.

This also provides the advantage that the termination can be released to enable inspection and repair.

Figure 3:
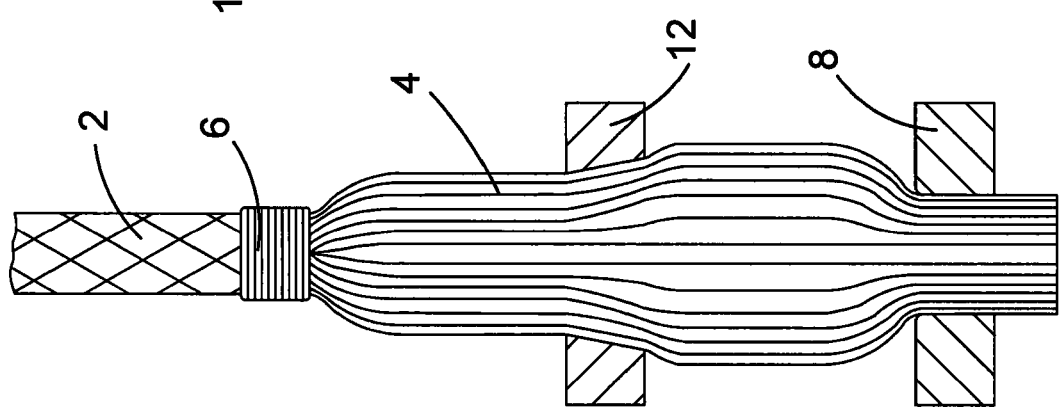
FIG. 3 is a side view of the tension member of FIGS. 1 and 2 in which the fibres to which a curable resin has been applied are in the process of being compressed.
Figure 2:
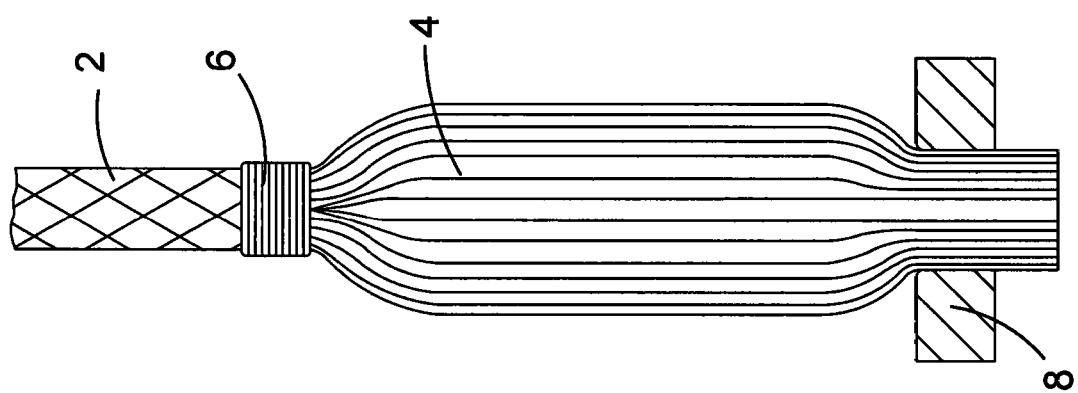
FIG. 2 is a side view of the tension member of FIG. 1 to which a curable resin has been applied to the straightened fibres.
Figure 1:
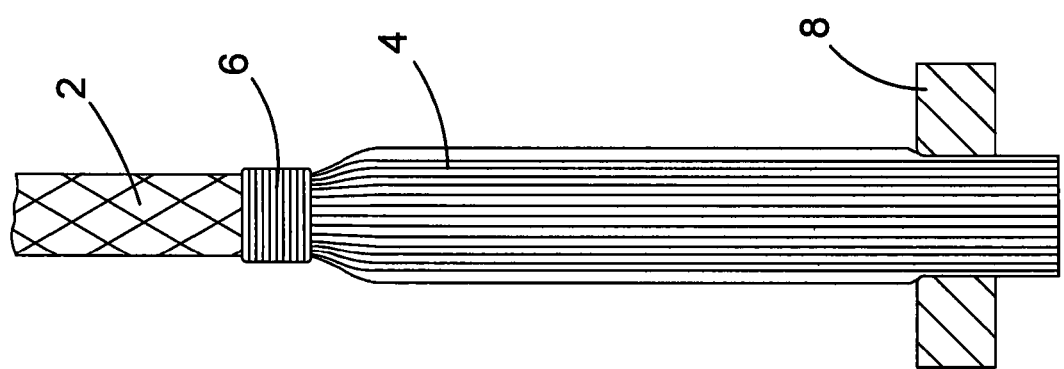
FIG. 1 is a side view of a tension member formed from natural or synthetic fibres, in which the fibres forming the tension member have been separated such that they are substantially straight and parallel in a first step of a method of forming a rigid rod on an end of the tension member of a first embodiment of the present invention.
Figures 5, 6:
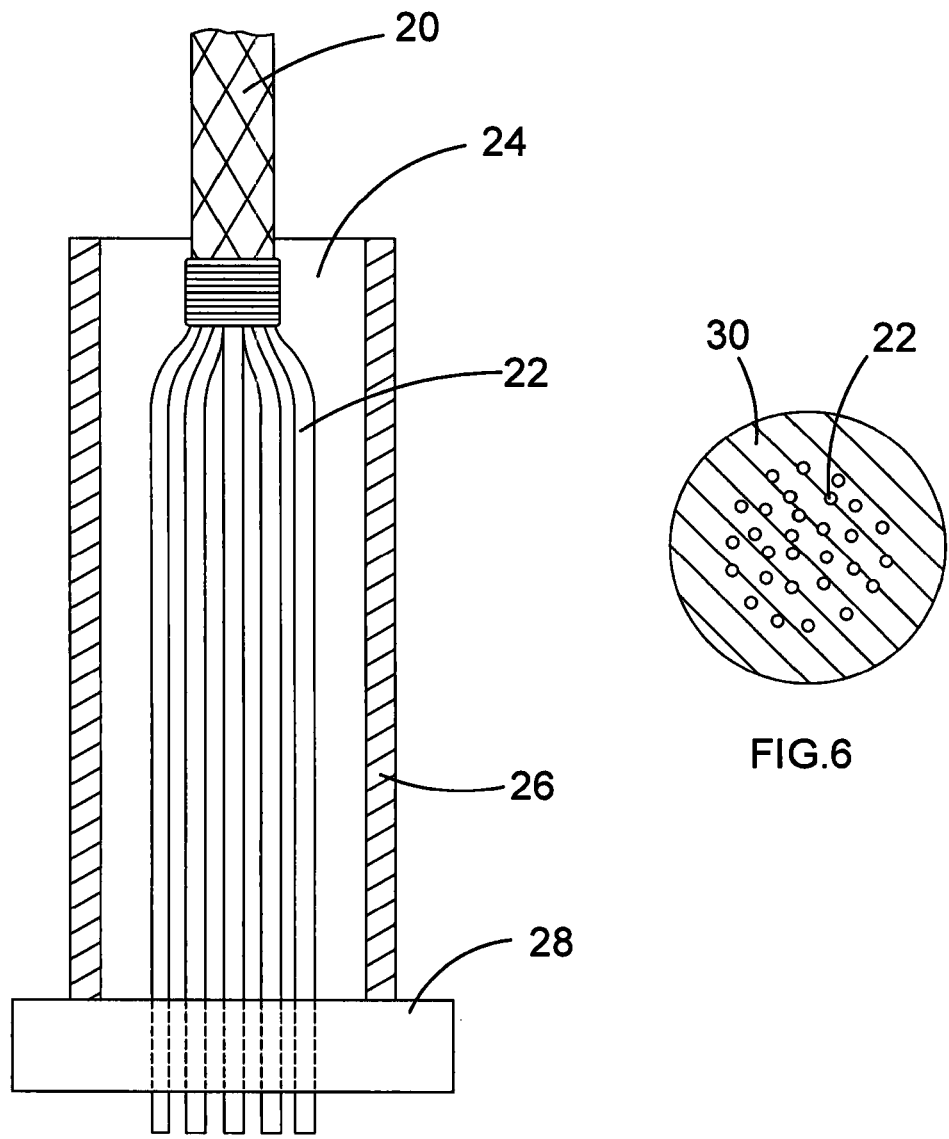
FIG. 5 is a cross-sectional view of a mould in which a wire rope of which the individual wires forming the rope have been substantially straightened are held, the mould to be filled with curable resin or molten metal in a second embodiment of method of forming a rigid rod on an end of the tension member.
FIG. 6 is a cross-sectional view of the end of the rope of FIG. 5 on which a rod has been formed.
Figure 10:
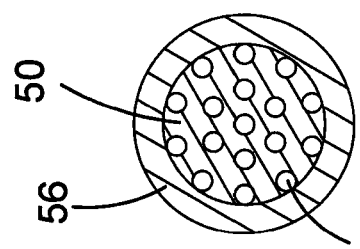
FIG. 10 is a cross-sectional view of the tension member of FIG. 9 after a sleeve has been formed on the rod.
Figure 9:
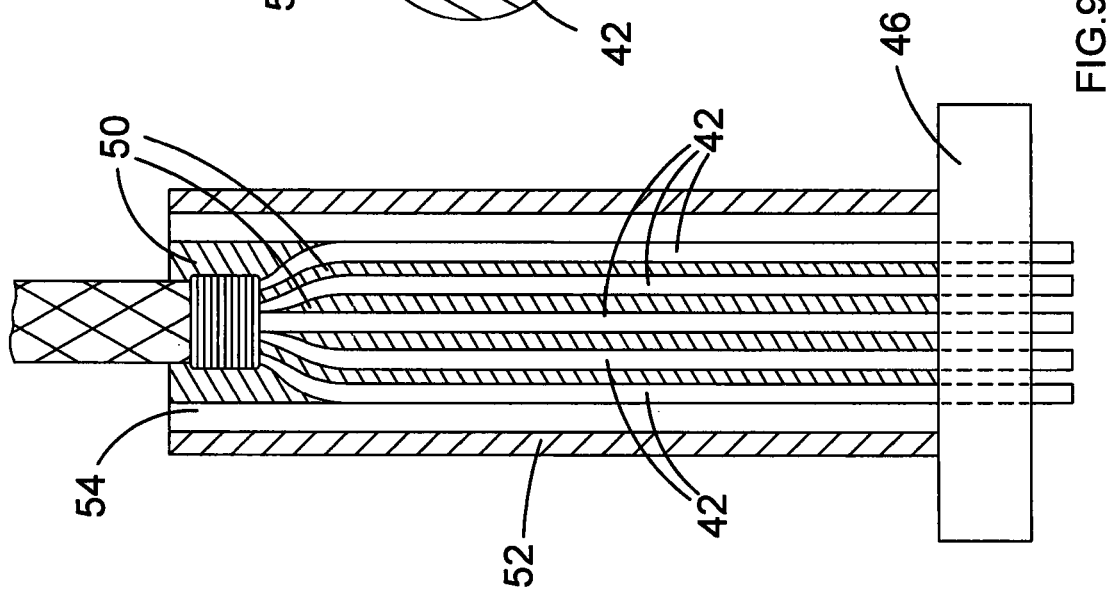
FIG. 9 is a cross-sectional view of a second larger mould in which the tension member of FIGS. 7 and 8 on which a rod has been formed on an end thereof is held.
Figure 8:
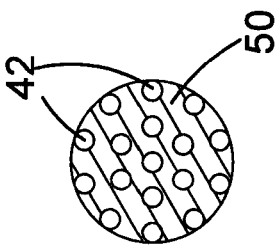
FIG. 8 is a cross-sectional view of the end of the tension member of FIG. 7 after the first stage of forming a rod.
Figure 7:
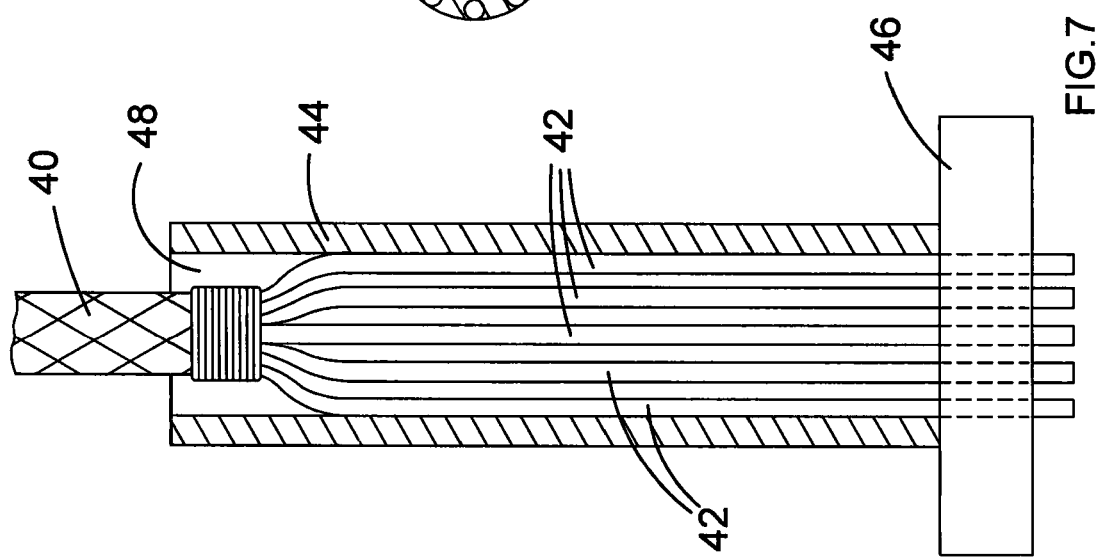
FIG. 7 is a cross-sectional view of a mould in which a tension member formed from wire of which the wires forming the tension member have been straightened is held to be filled with curable resin or molten metal in accordance with a third embodiment of a method of forming a rigid rod on the end of the tension member.
Figure 11A:
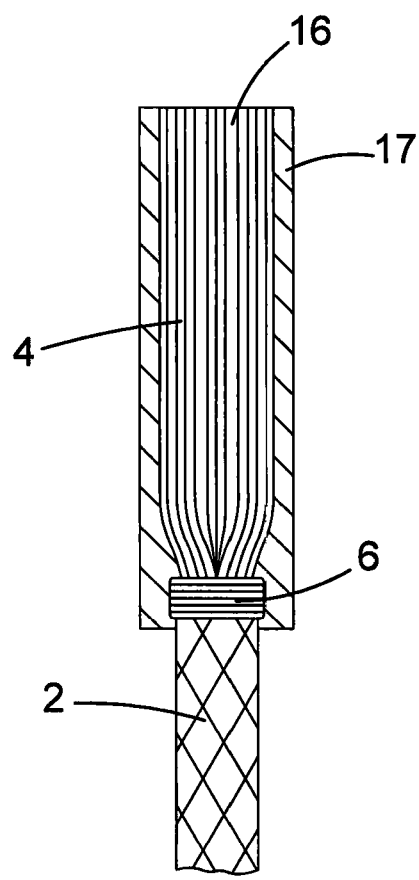
FIG. 11a is a cross-sectional view of a tension member on which a rigid rod and first sleeve has been formed on an end thereof in accordance with a fourth embodiment of the present invention.
Figure 11B:
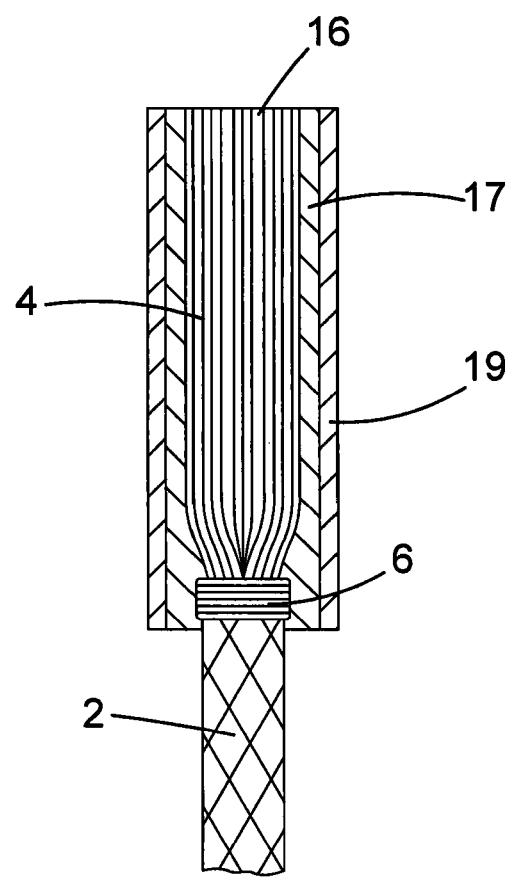
FIG. 11b is a cross-sectional view of a tension member on which a rigid rod and first and second sleeves have been formed on an end thereof in accordance with a fifth embodiment of the present invention.
Figure 12:
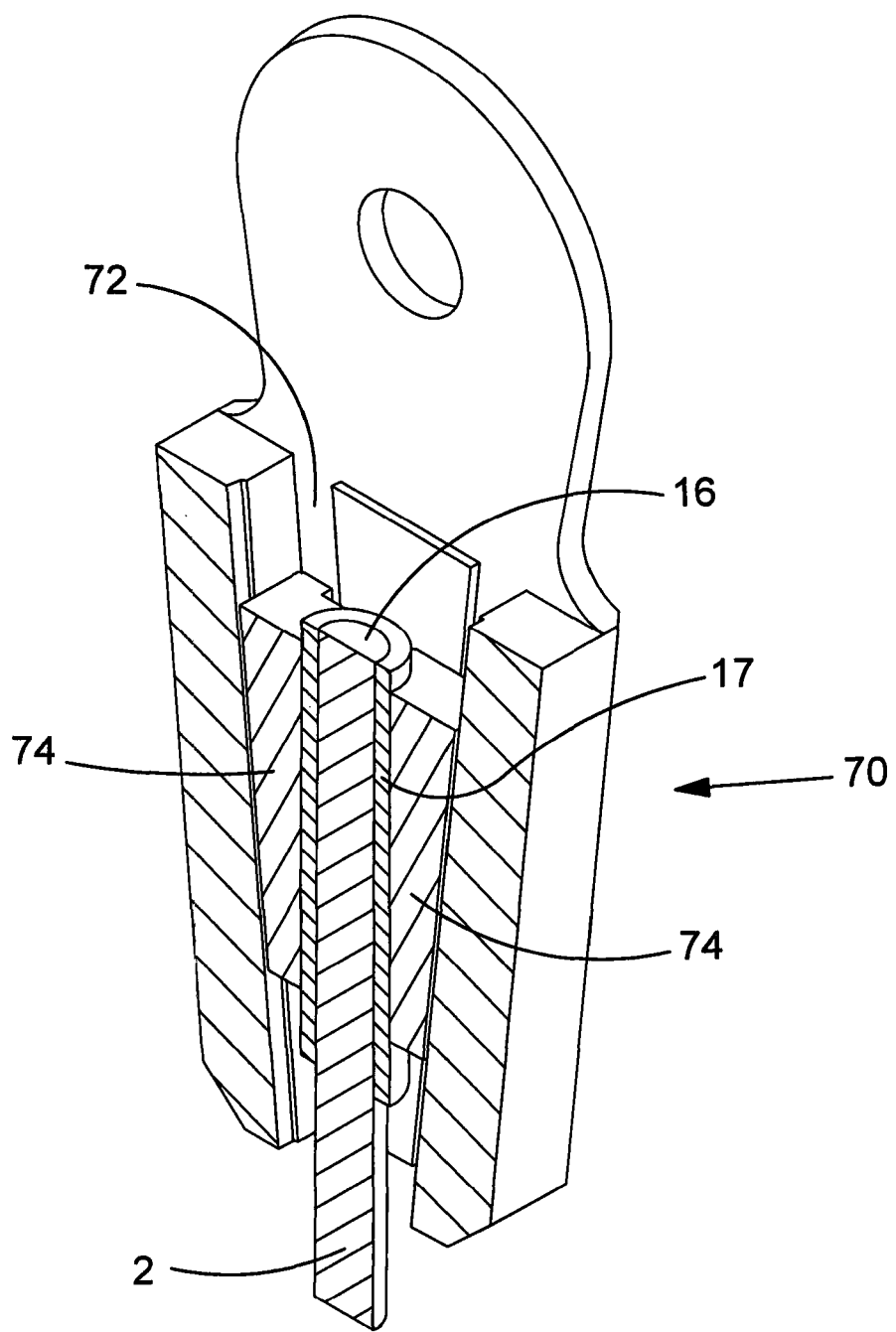
FIG. 12 is a cross-sectional perspective view of a wedged termination of a sixth embodiment of the present invention in which a tension member on which a rigid rod has been formed thereon is held.

Preferred embodiments of the present invention will now be described, by way of example only, and not in any limitative sense, with reference to the accompanying drawings in which:

FIG. 1 is a side view of a tension member formed from natural or synthetic fibres, in which the fibres forming the tension member have been separated such that they are substantially straight and parallel in a first step of a method of forming a rigid rod on an end of the tension member of a first embodiment of the present invention;

FIG. 2 is a side view of the tension member of FIG. 1 to which a curable resin has been applied to the straightened fibres;

FIG. 3 is a side view of the tension member of FIGS. 1 and 2 in which the fibres to which a curable resin has been applied are in the process of being compressed;

FIG. 4 is a cross-sectional view of a mould in which the tension member of FIG. 1 is held in order to be filled with curable resin to set to form a rod with a sleeve;

FIG. 5 is a cross-sectional view of a mould in which a wire rope of which the individual wires forming the rope have been substantially straightened are held, the mould to be filled with curable resin or molten metal in a second embodiment of method of forming a rigid rod on an end of the tension member;

FIG. 6 is a cross-sectional view of the end of the rope of FIG. 5 on which a rod has been formed;

FIG. 7 is a cross-sectional view of a mould in which a tension member formed from wire of which the wires forming the tension member have been straightened is held to be filled with curable resin or molten metal in accordance with a third embodiment of a method of forming a rigid rod on the end of the tension member;

FIG. 8 is a cross-sectional view of the end of the tension member of FIG. 7 after the first stage of forming a rod;

FIG. 9 is a cross-sectional view of a second larger mould in which the tension member of FIGS. 7 and 8 on which a rod has been formed on an end thereof is held;

FIG. 10 is a cross-sectional view of the tension member of FIG. 9 after a sleeve has been formed on the rod;

FIG. 11a is a cross-sectional view of a tension member on which a rigid rod and first sleeve has been formed on an end thereof in accordance with a fourth embodiment of the present invention;

FIG. 11b is a cross-sectional view of a tension member on which a rigid rod and first and second sleeves have been formed on an end thereof in accordance with a fifth embodiment of the present invention; and FIG. 12 is a cross-sectional perspective view of a wedged termination of a sixth embodiment of the present invention in which a tension member on which a rigid rod has been formed thereon is held.

Referring to FIG. 1, a tension member 2 formed from synthetic or natural fibres 4 is to have a rigid rod formed on the end thereof. It should be understood that the term tension member generally refers to ropes in which individual fibres and yarns are wound into strands to form the rope.

The first stage of this method is to separate the fibres 4 from the wound condition forming the rope and straighten the fibres such that they are substantially parallel. The fibres 4 are therefore broomed out and can be brushed to arrive at the condition of FIG. 1. To assist this process, a ligature 6 is placed around the tension member 2 at the point where the fibres 4 are to be straightened. The fibres 4 are then held in the base 8 of mould 10. Referring to FIG. 2, a curable resin such as castable synthetic polymer resin such as a slow cure resin with no sand is applied around the fibres 4. It can be seen that the wetting of the fibres 4 with such a curable resin causes the diameter of the straightened portion to increase. For example, it has been found that the diameter of a 10 mm rope will increase to around 20 mm.

Referring to FIG. 3, to improve the distribution of curable resin throughout the fibres 4, fibres 4 are compressed by running a compression tool 12 along the wetted portion of the fibres 4. It can be seen that this compresses the fibres 4 to reduce diameter.

Referring to FIG. 4, the side of mould 10 is then placed on base 8 trapping compression tool 12 as part of the mould. The curable resin is allowed to set to form rod 16 (FIGS. 11a, 11b and 12) and the mould 10 may then be removed.

In FIG. 4, it can be seen that there is a clearance between the fibres 4 and the side 10 of the mould. This configuration is advantageous in that when the cylindrical cavity 14 defined by the mould is filled with curable resin, none of the fibres 4 will be located close to the edge of the rod to be formed. The curable resin is then allowed to set, and the mould removed to form both a rigid rod 16 and first sleeve 17 (FIG. 11a) on the end of the tension member. The cylindrical cavity 14 is preferably a vacuum.

To form the sleeve 17, slow cure resin without sand or a resin product such as Paralock® or Wirelock® manufactured by Millfield Enterprises Limited of the United Kingdom is preferably used to fill cavity 14. The cavity 14 between the fibres 4 and the mould 10 to enable sleeve 17 to be formed ensures that the fibres 4 are not located too close to the outer surface of the final sleeve 17. This is advantageous because having fibres 4 projecting from the surface of rod 16 can make the termination prone to slip because the fibres 4 contact moveable parts of the wedge termination. Furthermore, if a second sleeve 19 (FIG. 11b) is to be formed around the first sleeve 17, it is preferable to grind the surface of first sleeve 17 with an abrasive surface such as sand paper and having fibres close to the surface of first sleeve 17 would prevent this.

Referring to FIGS. 11a and 11b, the formation of a first sleeve 17 around rigid rod 16 is desirable to ensure that no fibres 4 are located close to the surface of the rod 16. The configuration of FIG. 11a is suitable for ropes of small diameter and for ropes in which overheating during curing of the resin is unlikely to be a problem.

Alternatively, for ropes of larger diameter and ropes where overheating may be a problem during curing of the resin, the configuration of FIG. 11b is desirable. In this configuration, the rod 16 is formed as described above and the first sleeve 17 formed when the cavity 14 of the mould is filled with additional resin. Once the rod 16 and first sleeve 17 are cured and set, the rope 2 can be placed into a larger mould to enable additional sleeve 19 to be poured.

It should be understood that for all different configurations, the first step is to form the end of the rope 2 into a rigid rod 16 by straightening the fibres 4 and impregnating with resin as described above.

Referring to FIG. 5, a method of forming a rigid rod on the end of a wire rope of a second embodiment of the present invention is described. The principle is like that for a fibre rope, but wires do not behave as fibres. For a wire rope, there are fewer elements (wires) but the elements are stiffer. Wire rope 20 comprises wires 22 which are straightened as much as possible and then held by base 28 of mould 26. In this embodiment, the whole cylindrical cavity 24 is filled with molten metal or curable resin to form rod 30, as shown in cross-sectional FIG. 6. It can be seen that the wires 22 are fully embedded in the cured resin or metal of rod 30.

An alternative method of forming a rigid rod on an end of a wire rope of a third embodiment of the present invention is shown in the FIGS. 7 to 10. This method is useful for wire ropes 40 with particularly stiff wires 42 that are difficult to straighten. It is highly desirable to ensure that none of the wires 4 are located close to the edge of the rod which can cause the rod to be fragile. In this method, a two-stage moulding process is used, which can also be advantageous to manage dispersal of heat for particularly large ropes as resin cures or molten metal solidifies.

The wires 42 at the end of rope 40 are therefore straightened as much as possible and placed in a mould 44 which contacts external wires 42. The wires 42 are held by base 46 of the mould 44. Molten metal or curable resin is then poured into the cylindrical cavity 48 formed by the mould 44. This forms rod 50 having an initial diameter in which some of the wires 42 are close to the edge of the rod 50.

The rod 50 is then placed in a second larger mould 52 and a further pouring of molten metal or castable resin is made into cylindrical cavity 54. Once set, this forms a sleeve 56 around rod 50. It can therefore be seen from FIG. 10 that there are no wires 42 close to the edge of sleeve 46.

Referring to FIG. 12, a termination 70 for terminating a fibre rope 2 on which a rigid rod 16 of curable resin has been formed thereon is shown. The end of rope 2 on which rod 16 is formed is placed in tapered cavity 72. Wedges 74 are then driven between the sides of cavity 72 and rod 16 (formed from the methods of FIGS. 1 to 4). Pulling rope 2 self-locks the rod 16 in the termination 70 by urging wedges 74 downwardly. This prevents removal of the rope 2. It has been found that such a termination using the rigid rod 16 formed from the method of FIGS. 1 to 4 can terminate larger fibre ropes with much less occurrence of failure due to the fact that the load is distributed evenly through the straightened fibres encased in rod 16.

Termination 70 can also be used to terminate wire ropes on which a rod has been formed thereon in accordance with the methods of FIGS. 5 to 10.

It will be appreciated by persons skilled in the art that the above embodiments have been described by way of example only and not in any limitative sense, and that various alterations and modifications are possible without departure from the scope of the invention as defined by the appended claims.

The invention claimed is:

1. A method of forming a rigid rod on an end of a tension member formed from at least one of natural and synthetic fibres, the method comprising:
   separating the fibres forming said end of said tension member and arranging said fibres such that they are substantially straight and parallel to one another;
   applying a curable resin to said fibres;

compressing said fibres to which said curable resin has been applied;

arranging said fibres in a mould and allowing said resin to set to form a rod containing said fibres; and removing the mould once said curable resin has set.

2. The method of claim 1, further comprising gripping the ends of said fibres with a base of said mould after the fibres have been straightened.

3. The method of claim 1, wherein the step of compressing said fibres to which said curable resin has been applied comprises passing said fibres through an aperture of a compression member.

4. The method of claim 1, wherein the step of separating the fibres forming an end of a tension member and arranging said fibres such that they are substantially straight includes brooming out and/or brushing said fibres.

5. The method of claim 1, wherein the step of arranging said fibres in a mould and allowing said resin to set to form a rod includes arranging said fibres in a mould having a substantially cylindrical cavity.

6. The method of claim 1, further comprising the step of filling a cylindrical cavity defined by the mould with further curable resin to form a first sleeve around the end of said fibres.

7. The method of claim 6, further comprising the step of placing said rod and first sleeve in a larger mould and filling said larger mould with further curable resin to form a second sleeve around the end of said rod.

\* \* \* \* \*